(12) United States Patent
Parenzan

(10) Patent No.: US 11,639,790 B2
(45) Date of Patent: May 2, 2023

(54) LOW VOLTAGE LAMP FOR EXTERNAL USE

(71) Applicant: Mosaic S.p.A., Turin (IT)

(72) Inventor: Guido Parenzan, Bergamo (IT)

(*) Notice: Subject to any disclaimer, the term of this patent is extended or adjusted under 35 U.S.C. 154(b) by 0 days.

(21) Appl. No.: 17/772,573

(22) PCT Filed: Oct. 27, 2020

(86) PCT No.: PCT/IB2020/060055
§ 371 (c)(1),
(2) Date: Apr. 28, 2022

(87) PCT Pub. No.: WO2021/084415
PCT Pub. Date: May 6, 2021

(65) Prior Publication Data
US 2023/0025465 A1    Jan. 26, 2023

(30) Foreign Application Priority Data
Oct. 28, 2019   (IT) .......................... 102019000019820

(51) Int. Cl.
| | | |
|---|---|---|
| F21V 31/00 | (2006.01) | |
| H01R 33/965 | (2006.01) | |
| F21V 23/06 | (2006.01) | |
| F21S 4/10 | (2016.01) | |
| F21V 23/00 | (2015.01) | |
| H01R 33/22 | (2006.01) | |

(52) U.S. Cl.
CPC .............. *F21V 31/005* (2013.01); *F21S 4/10* (2016.01); *F21V 23/002* (2013.01); *F21V 23/06* (2013.01); *H01R 33/22* (2013.01); *H01R 33/9651* (2013.01)

(58) Field of Classification Search
CPC ...... F21V 31/005; F21V 23/002; F21V 23/06; F21S 4/10; H01R 33/22; H01R 33/9651
See application file for complete search history.

(56) References Cited

U.S. PATENT DOCUMENTS

| | | | | |
|---|---|---|---|---|
| 1,224,030 A | * | 4/1917 | Smith ................ | H01R 13/5219 439/280 |
| 5,688,138 A | | 11/1997 | Chuang | |
| 6,648,498 B1 | | 11/2003 | Tsao | |
| 2006/0273720 A1 | * | 12/2006 | Kwong ................... | H01J 61/52 313/569 |

FOREIGN PATENT DOCUMENTS

| | | |
|---|---|---|
| GB | 119539 A | 10/1918 |
| GB | 2118380 A | 10/1983 |
| KR | 101830353 B1 | 2/2018 |

* cited by examiner

*Primary Examiner* — Tsion Tumebo

(57) ABSTRACT

Low voltage lamp (10) for external use, comprising: •—a hollow and sealed container body (31) consisting of at least two opening half-shells (11.1), filled with insulating gel (G) and containing a terminal connection block (12); •—at least one light source (L) having at one of its extremities at least one electrical and mechanical connection means (13) which is electrically branched by means of electrical wires (25) with respect to said block (12); wherein at least said wires (25) and at least one portion of said connection means (13) are housed in a sealed manner in said container body (31) by means of said gel (G), which encloses them like a cast, and wherein said gel (G) is configured to model its shape on said wires (25), said block (12) and said at least one portion of said connection means (13), in a reversible manner.

6 Claims, 5 Drawing Sheets

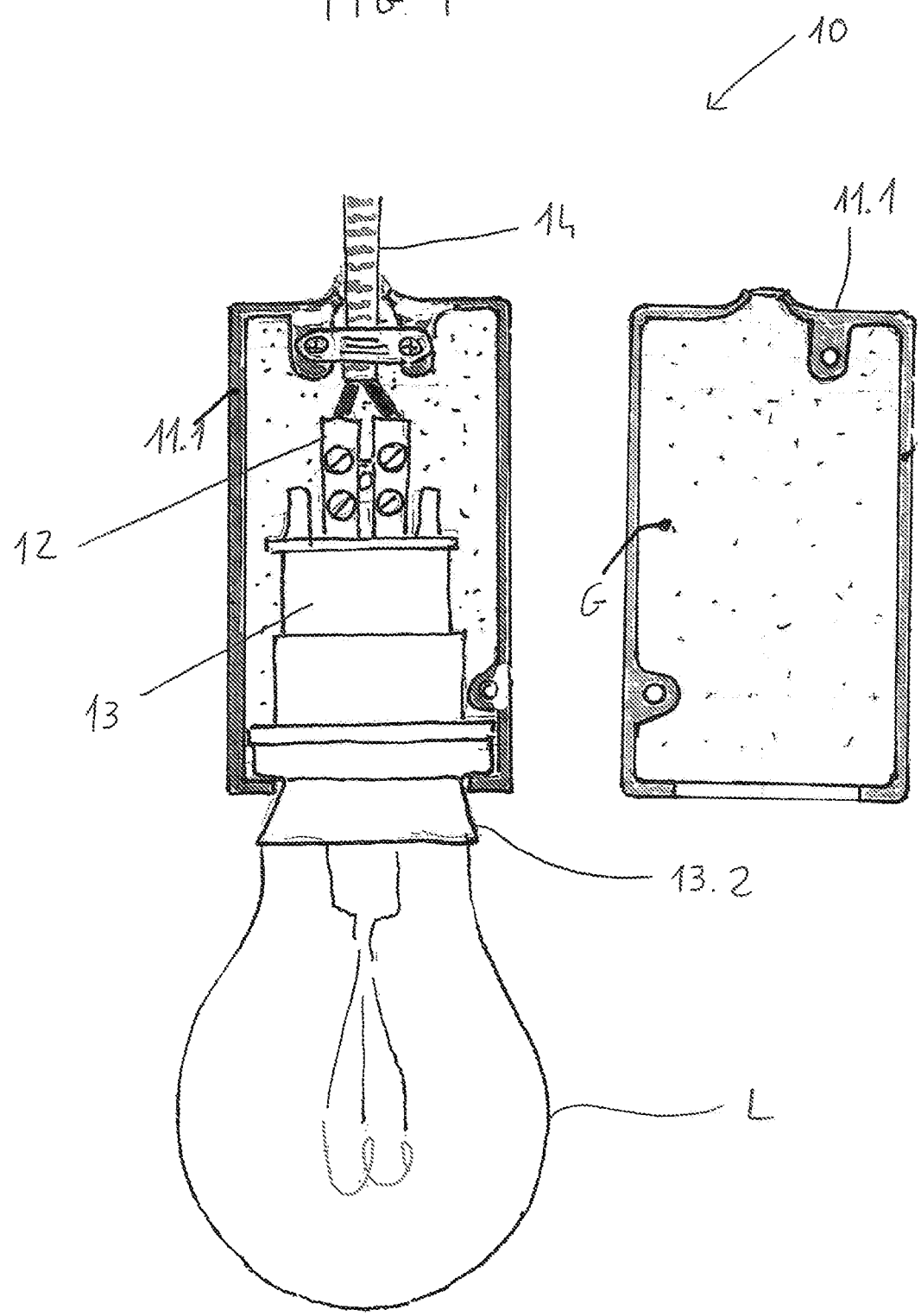

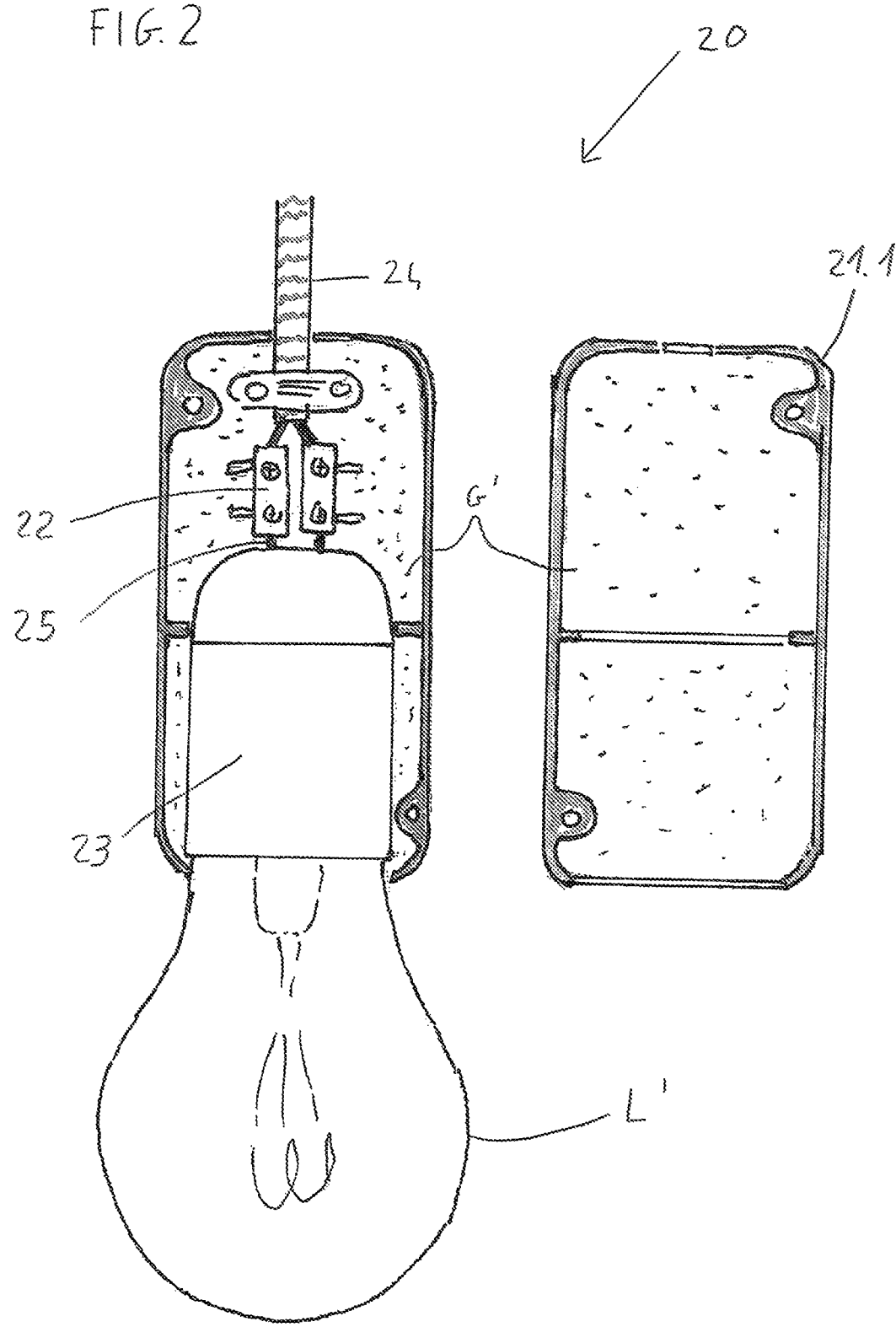

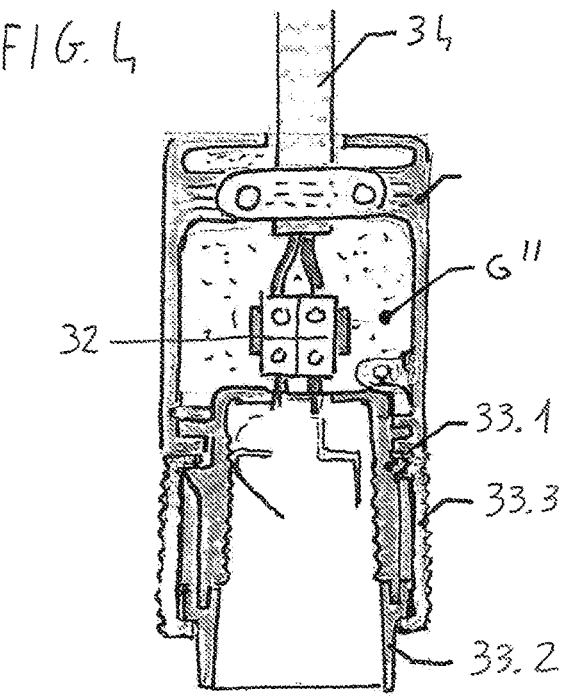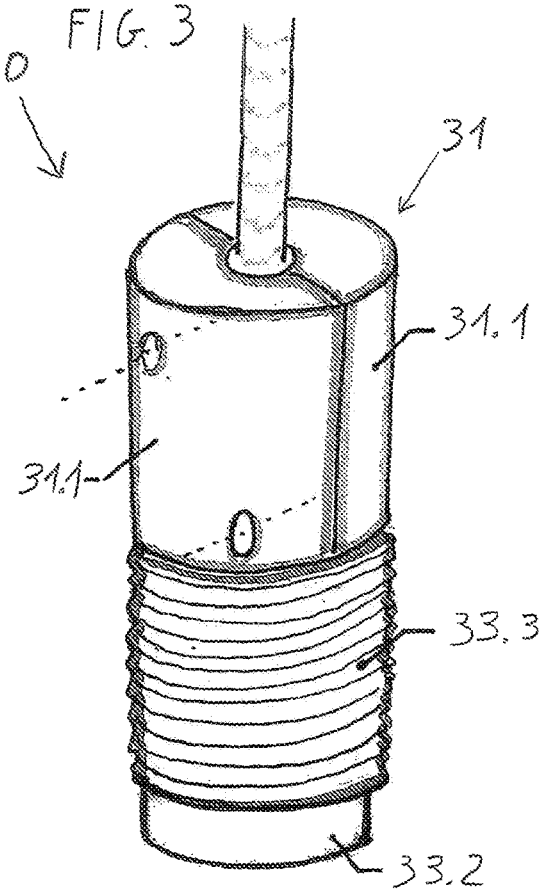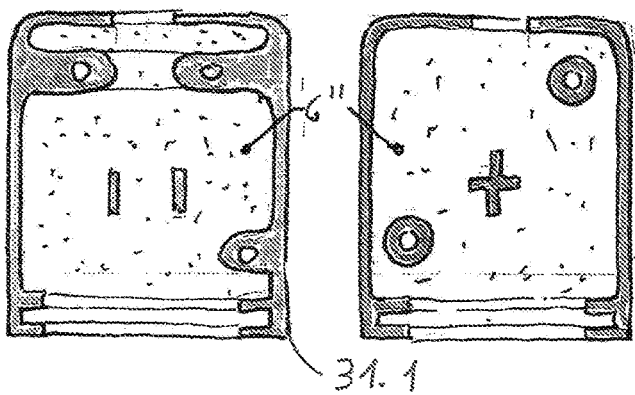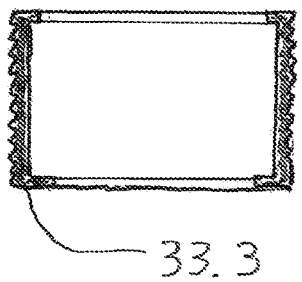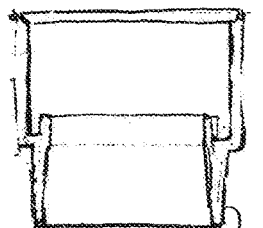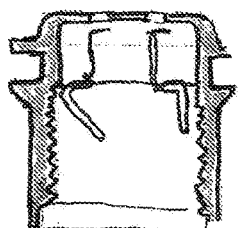

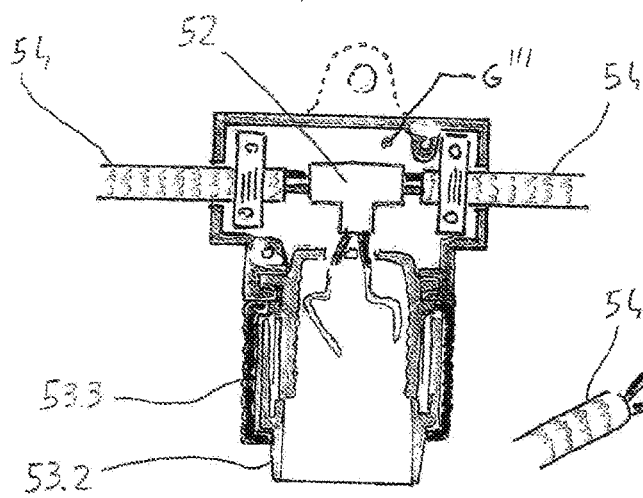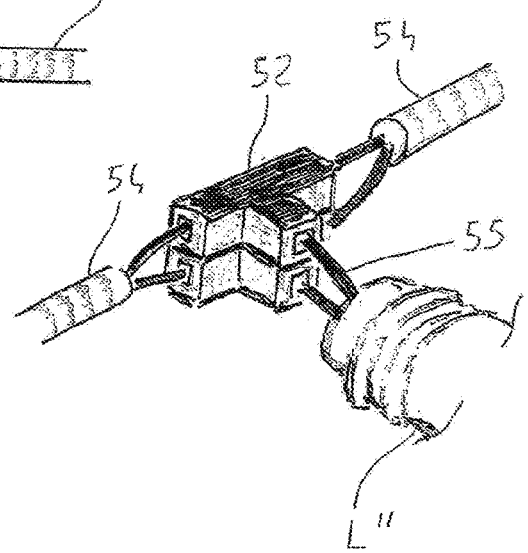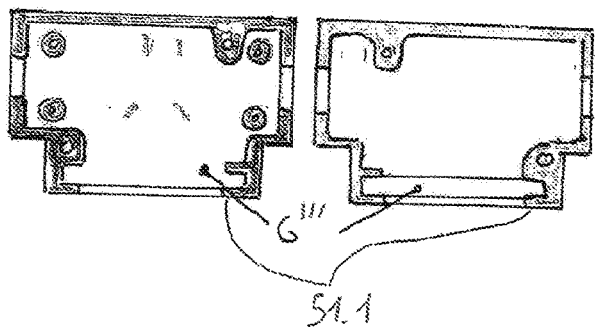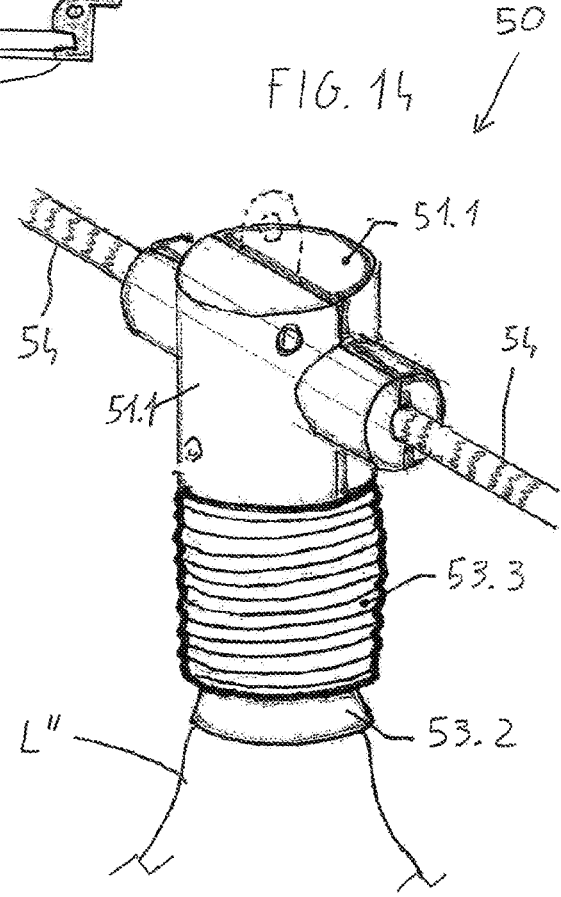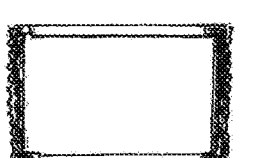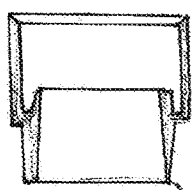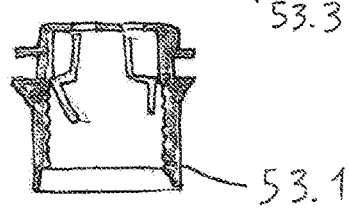

LOW VOLTAGE LAMP FOR EXTERNAL USE

This is the national stage of International Application PCT/IB2020/060055, filed Oct. 27, 2020.

The present invention relates to a low voltage lamp, and also extra-low voltage lamp, i.e. below 48V, for external use.

Currently lamps for external use commonly have a protection rating of IP44, i.e. are only able to withstand water sprayed for short periods of time and must therefore be removed in case of rain. Protection against weather conditions becomes extremely difficult when electrical cables with a fabric coating are used, as by nature they do not coact effectively with gaskets and are subject to phenomena of capillarity. Atmospheric humidity and conditions of use also favour chemical phenomena of oxidation-reduction and photodegradation causing a structural deterioration of said lamps, with consequent risks of catastrophic corrosion, electrocution or fire.

There is the need to provide a safe low voltage lamp for external use, with structural and internal components that can be easily accessed, replaced and inspected.

Besides, it is desirable not to have to remove a lamp for external use due to bad weather.

The document GB2118380A discloses a low voltage lamp for external use having the features of the pre-characterising part of claim 1.

In view of these objects, the present invention provides a low voltage lamp for external use, the essential feature of which is the subject-matter of claim 1.

Further advantageous features of the invention are described in the dependent claims.

Features and advantages of the invention will be more apparent from the detailed description of examples of embodiment provided below, with reference to the accompanying drawings, which show important details for the invention, and from the claims.

The features illustrated here are not necessarily drawn to scale and are represented so that the distinctive features according to the invention are clearly highlighted.

The various features can be produced individually or in any combination with one another, as variants of the invention.

The aforesaid low voltage lamp for external use comprises:
- a hollow and sealed container body consisting of at least two opening half-shells, filled with insulating gel and containing a terminal connection block electrically connected, by means of first electrical wires, to an electrical power supply network at least partially external to said hollow and sealed container body;
- at least one light source having at one of its extremities at least one electrical and mechanical connection means;
- an electrical and mechanical connection means of said light source electrically branched by means of second electrical wires with respect to said terminal connection block;

and is characterised in that at least said second electrical wires and at least one corresponding portion of said electrical and mechanical connection means are housed in a sealed manner in said sealed container body by means of said insulating gel, which encloses them like a cast, and in that said gel is configured to model its shape on said second electrical wires, said terminal connection block and said at least one corresponding portion of said electrical and mechanical connection means, in a reversible manner.

Moreover, in said lamp, wherein said light source is a light bulb with a sleeve, either with socket, or with bayonet coupling, said electrical and mechanical connection means is configured as a sleeve connector, either for socket or for bayonet couplings, and comprises a gasket partially covering said connector and an externally threaded outer sleeve to engage a corresponding ring nut configured to support a light shade. Hereinafter, for simplicity, reference will be made to a light bulb with a sleeve, which may obviously have a socket coupling, for example of G9 type, or a bayonet coupling.

Besides, in said lamp, wherein said first electrical wires form a light chain line, said terminal connection block is configured to branch said second electrical wires electrically and maintain the electrical continuity of said first electrical wires in said chain line, and at least one part of said first electrical wires is contained in said hollow and sealed container body. Moreover, said lamp, wherein said first electrical wires form a light chain line, is characterised in that it comprises a first hollow sealed body consisting of at least one part, and filled with said insulating gel, in that said terminal connection block is contained inside said first hollow sealed body and is configured to branch said second electrical wires electrically and maintain the electrical continuity of said first electrical wires in said chain line, in that at least a part of said first electrical wires is contained in said hollow sealed body, in that said insulating gel encloses them like a cast and is configured to model its shape in a reversible manner on said first electrical wires and said second electrical wires, and in that at least a part of said second electrical wires is contained inside said first hollow sealed body.

The lamp for external use is further characterised in that it comprises a second hollow body consisting of at least one part, configured to coact with said sealed container body, respectively on said hollow sealed body, overlapping it externally and configured to be fixed in a disconnectable manner on said sealed container body, on said hollow sealed body, respectively.

In the drawing:

FIG. 1 is a sectional and elevational view of the low voltage lamp for external use, wherein a hollow and sealed container body consisting of two half-shells is illustrated open, according to a first example of embodiment of the invention;

FIG. 2 is a sectional and elevational view of the low voltage lamp for external use, wherein the hollow and sealed container body consisting of two half-shells is illustrated open, according to a second example of embodiment of the invention;

FIG. 3 is a perspective view of the low voltage lamp for external use, according to a third example of embodiment of the invention;

Figure 7:
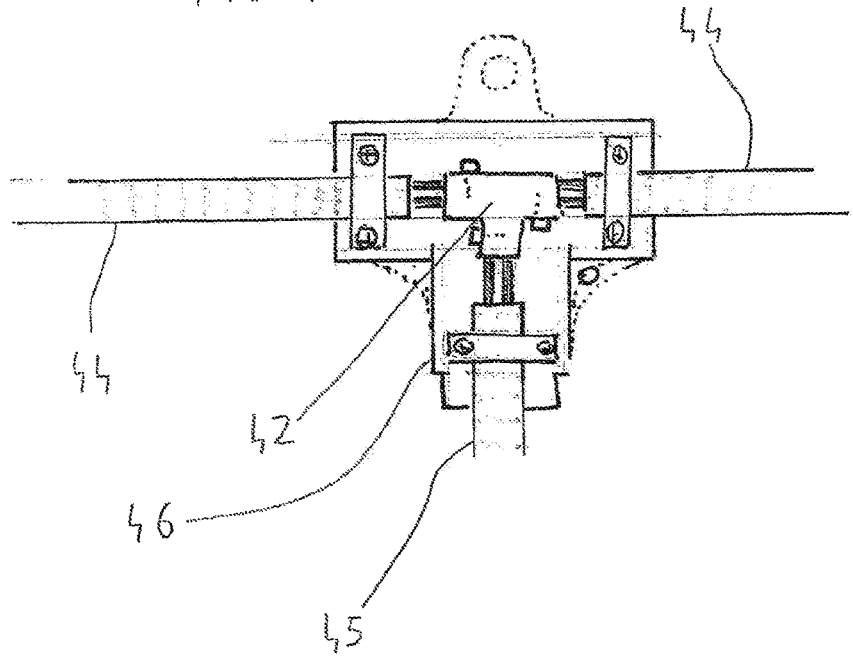
Figure 8:
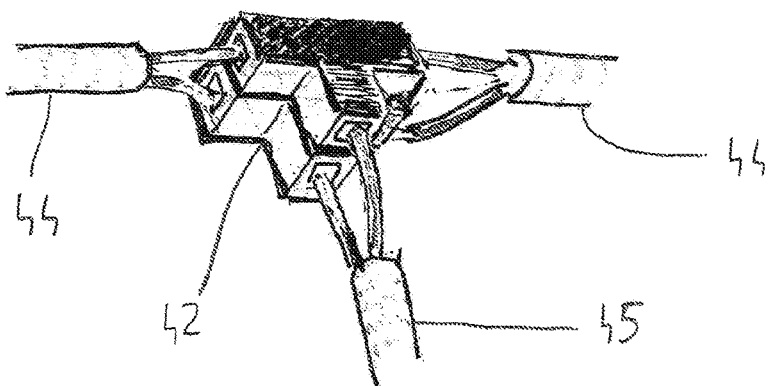
Figure 9:
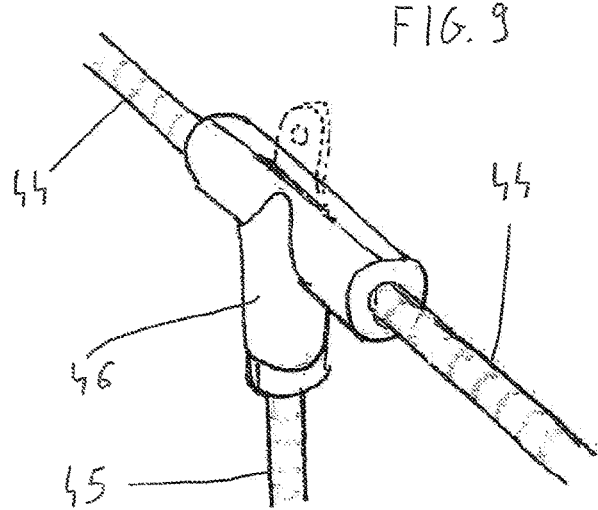

FIG. 4 a sectional view along an axial plane of the low voltage lamp for external use, according to the example of embodiment of the invention of FIG. 3;

FIG. 5 is a sectional and elevational view of the hollow and sealed container body consisting of two half-shells, illustrated open and without electrical and mechanical components, of the low voltage lamp for external use, according to the example of embodiment of the invention of FIG. 3;

FIGS. 6A, 6B and 6C are, respectively, axial sectional views of an external sleeve, of a covering gasket and of a sleeve connector of the electrical and mechanical connection means of said light source of said low voltage lamp for external use, according to the example of embodiment of the invention of FIG. 3;

FIG. 7 is a sectional view of a first hollow sealed body of said low voltage lamp for external use, open, according to a fourth example of embodiment of the invention;

FIG. 8 is a perspective view of a terminal connection block of the low voltage lamp for external use, according to the example of embodiment of the invention of FIG. 7;

FIG. 9 is a perspective view of said first hollow sealed body of said low voltage lamp for external use, according to the example of embodiment of the invention of FIG. 7;

FIG. 10 is an axial sectional view of the low voltage lamp for external use, according to a fifth example of embodiment of the invention;

FIG. 11 is a perspective view of a terminal connection block of the low voltage lamp for external use, according to the example of embodiment of the invention of FIG. 10;

FIG. 12 is a front elevational view of the first hollow sealed body, consisting of two half-shells and illustrated open, of said low voltage lamp for external use, according to the example of embodiment of the invention of FIG. 10;

FIGS. 13A, 13B and 13C are, respectively, axial sectional views of an external sleeve, of a covering gasket and of a sleeve connector of said electrical and mechanical connection means of said light source of said low voltage lamp for external use, according to the example of embodiment of the invention of FIG. 10;

FIG. 14 is a perspective view of the low voltage lamp for external use, according to the example of embodiment of the invention of FIG. 10, provided with a light source.

FIRST EMBODIMENT

With reference to the drawing, the reference number 10 indicates in FIG. 1 a low voltage lamp for external use. Said lamp 10 comprises a hollow and sealed container body 11, which consists of two half-shells 11.1 made of moulded plastic material, and the two half-shells 11.1 (illustrated disassembled) are filled with shape memory gel G. The reference L indicates a light bulb with a sleeve, which is housed in the inner part of a corresponding sleeve connector 13. A gasket 13.2 made of rubber material projects partially from the container body protecting the sleeve connector 13. The reference number 14 indicates first electrical wires (two copper cables) and the reference number 12 indicates a terminal connection block. Second electrical wires (not visible in the drawing) are integral with the inner part of the sleeve connector 13.

SECOND EMBODIMENT

With reference to the drawing, the reference number 20 indicates in FIG. 2 a low voltage lamp for external use. Said lamp 20 comprises a hollow and sealed container body 21, consisting of two half-shells 21.1 made of moulded plastic material, and the two half-shells 21.1 (illustrated disassembled) are filled with shape memory gel G'. The reference L' indicates a light bulb with a sleeve, which is housed in a corresponding sleeve connector 23, fully contained in said hollow and sealed container body. It can be noted that said insulating gel G' also encloses like a cast a part of the light source proximal to said sleeve connector 23. The reference number 24 indicates the first electrical wires, electrically connected to second electrical wires 25 by means of a terminal connection block 22.

THIRD EMBODIMENT

With reference to the drawing, the reference number 30 in FIG. 3 indicates a low voltage lamp for external use. A hollow and sealed container body 31 consists of two half-shells 31.1 made of moulded plastic material, and the two half-shells 31.1 (illustrated disassembled in FIG. 5) are filled with shape memory gel G" (FIGS. 4 and 5). With reference to FIG. 4, the shape memory gel G" encloses like a cast a part of first electrical wires 34, a part of second electrical wires 35 and a terminal connection block 32. The first electrical wires 34 are electrically connected to the second electrical wires 35 by means of the terminal connection block 32.

The second electrical wires 35 are electrically connected to a sleeve connector 33, illustrated in its parts in FIG. 6. In FIG. 6, in particular the reference number 33.1 indicates the inner part of the sleeve connector, the reference number 33.2 indicates a protective gasket made of rubber material and the reference number 33.3 indicates an externally threaded plastic sleeve, configured to coact with a corresponding ring nut adapted to support a light shade (not illustrated).

FOURTH EMBODIMENT

With reference to the drawing, FIGS. 7 to 9 illustrate a low voltage lamp for external use 40. In FIG. 7 the reference number 46 indicates a first hollow sealed body consisting of two half-shells 41.1 made of moulded plastic material. The reference number 44 indicates first electrical wires, which are part of a light chain. The first hollow body 46 is filled with shape memory gel that encloses like a cast a part of the first electrical wires 44, a part of the second electrical wires 45 and a terminal connection block 42. The terminal block 42 is configured to branch the second electrical wires 45 maintaining the electrical continuity of the light chain, which the first electrical wires 44 are part of. A hollow and sealed container body, not illustrated and consistent with that of FIG. 1, filled with shape memory gel, is connected to the second electrical wires 45 and supports the light source (not illustrated).

FIFTH EMBODIMENT

With reference to the drawing, the reference number 50 indicates in FIG. 14 a low voltage lamp for external use. The reference number 51 indicates a hollow sealed body consisting of two half-shells 51.1 made of moulded plastic material. The reference number 54 indicates first electrical wires, which are part of a light chain. The hollow body 51 is filled with shape memory gel that encloses like a cast a part of the first electrical wires 54, a part of the second electrical wires 55, a terminal connection block 52 and a part of a sleeve connector 53. A light bulb L" with a sleeve is connected to the sleeve connector 53. The first electrical wires 54 are connected to the terminal connection block 52. The terminal block 52 is configured to branch the second electrical wires 55 maintaining the electrical continuity of the light chain, which the first electrical wires 54 are part of. The second electrical wires 55 are integral with the inner part of the sleeve connector 53. The sleeve connector 53 is also provided with a protective gasket made of rubber material 53.2 and with an externally threaded plastic sleeve 53.3 configured to coact with a corresponding ring nut adapted to support a light shade.

It can be noted that in the embodiments illustrated the first electrical wires and/or the second electrical wires are provided with an external fabric coating. The lamp according to the invention effectively solves the problem of closing in a sealed manner also in relation to said electrical wires.

A further variant of the invention, not illustrated, provides for a low voltage lamp for external use comprising a second body, for example consisting of two coupled symmetrical parts made of plastic material, configured to coact with said hollow and sealed body, overlapping it externally and configured to be snap fitted in a disconnectable manner on said at least one sealed container body. This second hollow body has an aesthetical function and prevents photodegradation.

As can be seen from the foregoing, with the present invention it is possible to achieve the objects set forth in the introductory part of the present specification in a simple and effective manner.

The invention claimed is:

1. Low voltage lamp (10, 20, 30, 50) for external use, comprising:
    a hollow sealed container body (31) consisting of at least two opening half-shells (11.1, 21.1, 31.1, 51.1), filled with insulating gel (G, G', G") and containing a terminal connection block (12, 22, 32, 42, 52) electrically connected, by means of first electrical wires (14, 24, 34, 44, 54), to an electrical power supply network at least partially external to said hollow and sealed container body (31);
    at least one light source (L, L', L") having at one of its extremities at least one electrical and mechanical connection means;
    an electrical and mechanical connection means (13, 23) of said light source (L, L', L") electrically branched by means of second electrical wires (25, 45, 55) with respect to said terminal connection block (12, 22, 32, 42, 52);
    characterised in that at least said second electrical wires (25, 45, 55) and at least one corresponding portion of said electrical and mechanical connection means (13, 23) are housed in a sealed manner in said sealed container body (31) by means of said insulating gel (G, G', G"), which encloses them like a cast, and by the fact that said gel is configured to model its shape on said second electrical wires (25, 45, 54, 55), said terminal connection block (12, 22, 32, 42, 52) and said at least one corresponding portion of said electrical and mechanical connection means (13, 23), in a reversible manner.

2. Lamp (10, 20, 30, 50) according to claim 1, in which said light source is a light bulb (L, L', L") with a sleeve, either with socket, or with bayonet coupling, characterised in that said electrical and mechanical connection means (13, 23) is configured as a sleeve connector (13, 23), either for socket or for bayonet couplings, and comprises a gasket (13.2, 33.2, 53.2) partially coating said connector (13, 23) and an externally threaded outer sleeve (33.3, 53.3) to engage a corresponding ring nut configured to support a light shade.

3. Lamp (50) according to claim 1, in which said first electrical wires (44, 54) form a light chain line, characterised in that said terminal connection block (42, 52) is configured to branch said second electrical wires (45, 55) electrically and maintain the electrical continuity of said first electrical wires (44, 54) in said chain line, and by the fact that at least one part of said first electrical wires (44, 54) is contained in said hollow and sealed container body.

4. Lamp according to claim 1, in which said first electrical wires (44) form a light chain line, characterised in that it comprises a first hollow sealed body (46) consisting of at least one part, and filled with said insulating gel, by the fact that said terminal connection block (42) is contained inside said first hollow sealed body (46) and is configured to branch said second electrical wires (45) electrically and maintain the electrical continuity of said first electrical wires (44) in said chain line, by the fact that at least a part of said first electrical wires (44) is contained in said hollow sealed body (46), by the fact that said insulating gel encloses them like a cast and is configured to model its shape in a reversible manner on said first electrical wires (44) and said second electrical wires (45), and by the fact that at least a part of said second electrical wires (45) is contained inside said first hollow sealed body (46).

5. Lamp (20) according to claim 1, characterised in that said insulating gel (G') in said hollow and sealed container body, incorporates like a cast said electrical and mechanical connection means (23) of said light source (L') and a part of said light source (L') proximal to said electrical and mechanical connection means (23).

6. Lamp according to claim 1, characterised in that it comprises a second hollow body consisting of at least one part, configured to co-operate with said sealed container body, respectively on said hollow sealed body, overlapping it externally and configured to be fixed in a disconnectable manner on said sealed container body, respectively on said hollow sealed body.

* * * * *